United States Patent [19]

Deschanels et al.

[11] 4,283,750
[45] Aug. 11, 1981

[54] CAPACITOR HAVING A HOUSING PROVIDED WITH A CREASE WHICH IS EXPANDABLE IN REACTION TO OVERPRESSURE

[75] Inventors: François Deschanels; Roger Gard, both of Tours, France

[73] Assignee: U.S. Philips Corporation, New York, N.Y.

[21] Appl. No.: 95,736

[22] Filed: Nov. 19, 1979

[30] Foreign Application Priority Data

Nov. 20, 1978 [FR] France ............................. 78 32623

[51] Int. Cl.³ .............................................. H01G 1/11
[52] U.S. Cl. ..................................... 361/274; 361/275
[58] Field of Search ......................... 361/272, 274, 275

[56] References Cited

U.S. PATENT DOCUMENTS 3,221,225  11/1965  Sternbeck ..................... 361/275 X
4,059,848  11/1977  Koel .............................. 361/275 X Primary Examiner—E. A. Goldberg
Attorney, Agent, or Firm—Thomas A. Briody; Robert T. Mayer; James J. Cannon, Jr.

[57] ABSTRACT

A capacitor having a housing closed on one end by means of a bottom, in which housing a capacitor wrap is accommodated, said wrap having electrical connections which are fed out of the housing on the opposite end from the bottom. The housing includes a circumferential crease expandable in the axial direction of the wrap, which crease its upper side supports the wrap and on its other side a plug-like member for anchoring one end of one of the electrical connections. The plug-like member is located between the bottom and the crease and includes a hole which widens towards the bottom, which hole is filled with a synthetic resin in which one end of one connection is anchored. When an overpressure occurs in the capacitor housing, the crease is expanded and said one end of one connection is broken. The capacitor can be manufactured simply.

5 Claims, 4 Drawing Figures

CAPACITOR HAVING A HOUSING PROVIDED WITH A CREASE WHICH IS EXPANDABLE IN REACTION TO OVERPRESSURE

BACKGROUND OF THE INVENTION

1. Field of the Invention

The invention relates to a capacitor having a housing which is closed on one end by means of a bottom, which housing accommodates a capacitor wrap provided with electrical connections which are fed out of the housing through the end opposite the bottom, said housing having a crease which is expandable in the axial direction of the wrap and which, when expanded, on its upper side supports the wrap and on its lower side a plug-like member for anchoring one end of one of the electrical connections of the wrap.

A capacitor of this kind is particularly suitable for use as a ballast element in lighting systems using fluorescent lamps. When a capacitor of this kind is overloaded, for example, due to a short-circuit in the system, a substantial development of gas occurs in the capacitor wrap, accompanied by a pressure increase in the capacitor housing. The capacitor will not explode, because due to said pressure increase, the expandable crease is expanded, so that the connection of the capacitor wrap which is anchored in the plug-like member is detached, with the result that the system is switched off and a further pressure increase is prevented.

2. Description of the Prior Art

U.S. Pat. Spec. No. 3,221,225 discloses a capacitor of the described kind in which the wrap is situated between the expandable crease and the bottom of the housing and in which the plug-like member is clamped between the expandable crease and a lid which closes the housing. One of the connections of the capacitor wrap, being passed through the lid and the plug-like member, is tensioned between the plug-like member and the wrap. When a strong overpressure occurs inside the capacitor, this connection is broken.

For assembly of the known capacitor, the following method seems to be necessary. Using a suitable housing, the capacitor wrap is arranged inside the housing, after which the expandable crease is provided; subsequently, the connections of the wrap are passed through the plug-like member and the lid; subsequently, the plug-like member and the lid are arranged on the expandable crease; subsequently, one of the connections is tensioned between the wrap and the plug-like member, and finally the plug-like member and the lid are secured by way of a curled-over edge. This is a rather complex method. Moreover, because the comparatively fragile wrap is very vulnerable, the mechanical operation performed after arrangement of the wrap in the housing must be accurately controlled and carefully executed. An additional tool which is introduced into the housing with a wrap in order to provide a crease in the housing and which is subsequently removed again must also be very carefully and accurately manipulated.

SUMMARY OF THE INVENTION

The invention has for its object to mitigate the described drawbacks. To this end, a capacitor in accordance with the invention is characterized in that the plug-like member is located between the expandable crease and the bottom of the housing and includes a hole which widens towards the bottom of the housing which hole is filled with a synthetic resin in which one end of one electrical connection is anchored by means of a loop. Using a suitable housing, this capacitor can be comparatively simply manufactured by first arranging the plug-like member on the bottom of the housing, after which the expandable crease is provided. The hole in the plug-like member is next filled with a comparatively quickly setting resin, after which the wrap is positioned in the housing with a loop of one of its connections inserted in the resin. The resin is then allowed to set and ultimately the housing is closed by a closure which allows passage of the electrical connections of the wrap. During the creasing operation, the plug-like member is used as an abutment tool which need not be removed at a later stage, because it then serves for anchoring one end of one of the electrical connections of the wrap. This means that an additional tool is saved. Because the plug-like member is far less vulnerable than the capacitor wrap, moreover, the accuracy and care described above are no longer required for manipulating the tool during the creasing operation.

A preferred embodiment of the capacitor in accordance with the invention is characterized in that voids in the housing are completely filled with a synthetic resin which adheres only slightly to the wrap and which forms a closure with passages for the electrical connections of the wrap on the side of the housing opposite the bottom. Using a suitable housing, this capacitor can be very simply manufactured in that, after arrangement of the plug-like member on the bottom of the voids in the housing and the provision of the expandable crease, the housing are filled with the synthetic resin, after which the wrap is immersed in the synthetic resin, one end of one of the connections of the wrap then projecting, by way of a loop, into the hole in the plug-like member. After the setting of the resin, the capacitor is ready. Due to the fact that the resin adheres only slightly to the wrap, the resin constitutes only a weak connection to the wrap which is broken when pressure is exerted on this connection due to the development of gas in the wrap. In the space thus formed a pressure is built up which ensures that the crease is expanded, the anchored connection then being broken so that the capacitor is switched off. Because the capacitor is for the remainder completely filled with a synthetic resin, so that it is gas-free, gas discharges between different layers in the capacitor wrap, which limit the service life of such a capacitor are also avoided.

BRIEF DESCRIPTION OF THE DRAWING

The invention will be described in detail hereinafter, by way of example, with reference to the accompanying diagrammatic drawing.

DESCRIPTION OF THE PREFERRED EMBODIMENT

Figure 1:
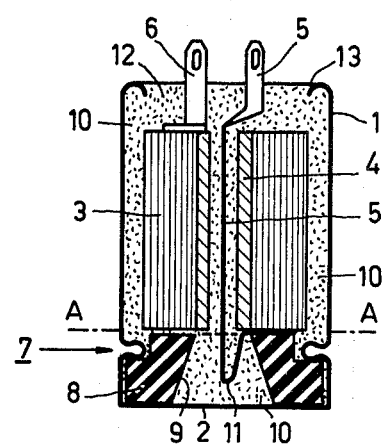
FIG. 1 is a longitudinal sectional view of a capacitor in accordance with the invention.

FIG. 1 is a longitudinal sectional view of a housing 1 which is closed on one end by means of a bottom 2, and which accommodates a capacitor wrap 3. The wrap 3 is wrapped on an insulating tube 4 which serves as a former and furthermore comprises electrical connections 5 and 6 which are fed out through the end of the housing 1 opposite the bottom 2. The housing 1 has a circumferential crease 7 which is expandable in the axial direction of the wrap 3 and which, when expanded, on its upper side supports the wrap 3 and on its lower side a plug-like member 8 for anchoring one end of one of the electrical connections of the wrap 3 (in this case connection 5). The plug-like member 8 is located between the expandable crease 7 and the bottom 2 of the housing 1 and includes a hole 9 which widens towards the bottom 2 of the housing 1. This hole 9 is filled with a synthetic resin 10 in which one end of electrical connection 5 is anchored by means of a loop 11. The remainder of the capacitor is completely filled with the synthetic resin 10 which adheres only slightly to the wrap 3 and which forms a housing closure 12 which allows passage of the electrical connections 5 and 6 through the end of the housing which is remote from the bottom 2.

Using a cylindrical aluminium housing 1, the capacitor can be simple manufactured by first positioning the plug-like member 8 which is made, for example, of polyamide (better known by its trade name "Nylon") and by subsequently making the expandable crease 7. During the creasing operation, the plug-like member 8 is used as an abutment tool which need not be removed at a later stage, because it then serves for anchoring the loop 11. At the same time, the end of the housing 1 which is remote from the bottom 2 is provided with a curled-over-edge 13 for the purpose of reinforcement. Subsequently, the housing 1 is filled with a comparatively quickly setting synthetic resin, such as a mixture of polyol resin and isocyanate in a ratio of approximately 1:1; after a few minutes this mixture polymerizes and expands to form a rigid foam. Before the setting of the resin, the capacitor wrap 3, being wound, for example, of polypropylene foil having a thickness of from 6 to $12.10^{-6}$ m, metallized in vacuum with an aluminium layer having a thickness of 15 to $30.10^{-9}$ m, is inserted so that one end of loop 11 of the connection 5 projects into the hole 9 in the plug-like member 8. The quantity of synthetic resin is chosen so that, after setting, its surface reaches just as far as the edge 13. After the setting of the resin, the capacitor is ready.

Figure 2:
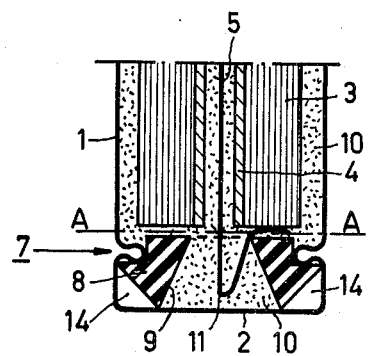
FIG. 2 is a longitudinal sectional view of a part of a preferred embodiment of a capacitor in accordance with the invention.

FIG. 2 is a longitudinal sectional view of a preferred embodiment of a capacitor in accordance with the invention, corresponding parts being denoted by the same reference numerals as used in FIG. 1. The plug-like member 8 has a truncated shape and encloses, in conjunction with the bottom 2 and the wall of the housing 1, a space 14 in which no synthetic resin is present. The purpose of this space will be explained below.

Figure 3:
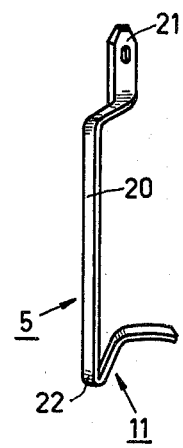
FIG. 3 shows an embodiment of a connection of the capacitor wrap.

FIG. 3 shows a version of the connection 5 which is made of a metal band 20 in which a connection eyelet 21 is provided near one end, and a weak spot is provided near the other end—in the loop 11—which is to be connected to the wrap 3. A connection of this kind can be inexpensively and simply manufactured in large quantities by a single punching operation.

Figure 4:
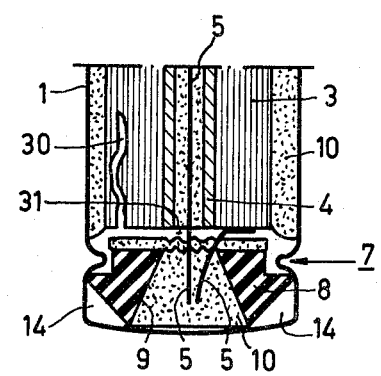
FIG. 4 shows the capacitor of FIG. 2 after the occurrence of an overpressure inside the capacitor housing.

FIG. 4 shows the capacitor of FIG. 2 after the occurrence of overpressure inside the capacitor housing.

When gas is developed in the wrap 3 due to a short circuit in a system incorporating the capacitor, as diagrammatically denoted by the reference numeral 30, a pressure is exerted on the connection A (FIG. 3) between the wrap 3 and the synthetic resin 10. Because this connection A is weak only due to the slight adherence of the synthetic resin 10 to the wrap 3, it will be broken as denoted by the reference numeral 31. In the space 31 thus formed a pressure is built up to ensure that the crease 7 is expanded. The anchored loop 11 of the connection 5 then breaks at the weak spot 22, so that the capacitor is switched off. Consequently, the capacitor will not explode. The space 14 in which no synthetic resin is present acts as an additional safety because, in the case of an extremely strong development of gas, the gas can also expand into this space 14.

The use of cured polyurethane foam for the synthetic resin 10 offers the advantage that the hardness of the foam is not so high. As a result the expansion of the crease 7 in reaction to an overpressure inside the housing 1 is not counteracted by the synthetic resin. It has been found that a foam expansion-degree of from 1.2 to 1.6 offers very good results in practice.

What is claimed is:

1. A capacitor having a housing which is closed on one end by means of a bottom and which accommodates a capacitor wrap, said wrap being provided with electrical connections which are fed out of the housing through the end opposite the bottom, said housing having a circumferential crease which is expandable in the axial direction of the wrap and which crease, when expanded, on its upper side supports the wrap and on its lower side a plug-like member for anchoring one end of one of said electrical connections of the wrap, characterized in that the plug-like member is located between the expandable crease and the bottom of the housing and includes a hole which widens towards the bottom of said housing, which hole is filled with a synthetic resin in which one end of one of said electrical connections is anchored by means of a loop in said end.

2. A capacitor as claimed in claim 1, characterized in that voids around the capacitor wrap within the housing are completely filled with a synthetic resin which adheres only slightly to the wrap and which forms a closure with passages for the electrical connections of the wrap on the side of the housing opposite the bottom.

3. A capacitor as claimed in claim 1, characterized in that the plug-like member has a truncated shape and encloses, in conjunction with the housing, a space in which no synthetic resin is present.

4. A capacitor as claimed in claim 3, characterized in that voids around the wrap within the housing are completedly filled, excluding the space defined by the truncated shape of said plug-like member, with a synthetic resin which adheres only slightly to the wrap and which forms a closure with passages for the electrical connections of the wrap on the side of the housing opposite the bottom.

5. A capacitor as claimed in claim 1, characterized in that the synthetic resin is rigid polyurethane foam.

* * * * *